United States Patent
Van der Wal et al.

(10) Patent No.: US 6,849,666 B2
(45) Date of Patent: Feb. 1, 2005

(54) POLYURETHANES CONTAINING DISPERSED CRYSTALLINE POLYESTERS

(75) Inventors: Hanno R. Van der Wal, Hoek (NL); Mark F. Sonnenschein, Midland, MI (US); Alan K. Schrock, Lake Jackson, TX (US); Francois Casati, Prévessin-Moens (FR); Christopher P. Christenson, Lake Jackson, TX (US); Zenon Lysenko, Midland, MI (US); Jozef Bicerano, Midland, MI (US); Fabio Aguirre, Geneva (CH); Sudhakar Balijepalli, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 110 days.

(21) Appl. No.: 10/332,310

(22) PCT Filed: May 15, 2001

(86) PCT No.: PCT/US01/15646
§ 371 (c)(1), (2), (4) Date: Jan. 6, 2003

(87) PCT Pub. No.: WO01/88005
PCT Pub. Date: Nov. 22, 2001

(65) Prior Publication Data
US 2004/0048942 A1 Mar. 11, 2004

Related U.S. Application Data

(60) Provisional application No. 60/204,222, filed on May 15, 2000.

(51) Int. Cl.$^7$ ............................................. C08G 18/28
(52) U.S. Cl. ............. 521/159; 252/182.24; 252/182.28; 521/170; 521/172; 521/173; 521/174; 528/74; 528/76; 528/80; 528/81; 528/85

(58) Field of Search ................................. 521/159, 170, 521/172, 173, 174; 252/182.24, 182.28; 528/74, 76, 80, 81, 85

(56) References Cited

U.S. PATENT DOCUMENTS

| | | | |
|---|---|---|---|
| 2,933,477 A | * | 4/1960 | Hostettler .................... 525/418 |
| 2,933,478 A | | 4/1960 | Young et al. |
| 3,666,734 A | | 5/1972 | Lalet et al. |
| 3,671,470 A | * | 6/1972 | Case .......................... 521/166 |
| 4,098,729 A | | 7/1978 | Kollmeier et al. |
| 4,211,849 A | | 7/1980 | Kollmeier et al. |
| 4,243,755 A | | 1/1981 | Marx et al. |
| 4,302,551 A | | 11/1981 | Horn et al. |
| 4,323,657 A | | 4/1982 | Mazanek et al. |
| 4,435,537 A | | 3/1984 | Horn et al. |
| 4,560,708 A | | 12/1985 | Horn et al. |
| 4,994,503 A | | 2/1991 | Harris et al. |
| 5,232,956 A | | 8/1993 | Gabbard et al. |
| 6,087,410 A | | 7/2000 | Falke et al. |

FOREIGN PATENT DOCUMENTS

GB        1 540 634 A       2/1979

OTHER PUBLICATIONS

Patent Abstracts of Japan, Uyama Hiroshi, *Production of Terminal Reacive Polyester*, Aug. 31, 2000, vol. 2000, No. 04.

* cited by examiner

Primary Examiner—John M. Cooney, Jr.

(57) ABSTRACT

A process is disclosed for producing resilient polyurethane foams by foaming an organic polyisocyanate, an isocyanate-reactive compound and a fusible polymer. The improvement in the hardness of the foams is achieved without adversely affecting the other properties of the foams, such as tensile strength and elongation.

16 Claims, No Drawings

POLYURETHANES CONTAINING DISPERSED CRYSTALLINE POLYESTERS

This application claims the benefit of Provisional Application No. 60/204,222, filed May 15, 2000.

The present invention is to a process for producing foams having improved load-bearing and resistance to humid aging without adversely affecting the other properties of the foam. In addition, the invention is to a flexible foam produced by this process.

Flexible polyurethane foams are well-recognized articles of commerce. The flexible foams are generally characterized by the process used in production, either molded or free rise. Flexible foams having high resilience (HR) are characterized as having higher comfort or support factor and higher resilience than non-HR foams or conventional foam. Flexible foam is generally prepared by employing an isocyanate, a high equivalent weight polyol, water as the reactive blowing agent, and appropriate catalysts, cross-linkers and surfactants.

The load bearing of such foams is generally expressed in terms of indentation force deflection (IFD) and/or compression force deflection (CFD). These measurements describe the ability of a foam to bear an applied load, such as that of a person sitting on a foam cushion in a chair or an automobile seat or lying on a mattress. Providing improved load bearing offers several potential advantages. For example, better load-bearing can permit one to obtain equivalent product performance at lower foam densities, thus reducing the amount of materials necessary to produce the seat or the mattress.

There are several known technologies for improving foam load-bearing. For example, an organic and/or inorganic filler can be added into the formulation. However, this causes the foam's density to increase while elongation at break and tear strength decrease substantially. Also poorer foam aging properties are obtained when fillers are used. The equivalent weight of the polyol component can be reduced, however; this causes a loss of elongation and raises the glass transition temperature of the polyurethane while detrimentally affecting foam resiliency.

U.S. Pat. No. 4,098,729 describe the use of high melting cross-linkers with functionality higher than 2 to improve the hardness of the foam.

Moreover certain types of crystalline or semi-crystalline fillers have been tried to improve load bearing. U.S. Pat. No. 4,243,755 claims a process for the manufacture of reinforced polyurethane foams with fillers produced in situ and having particle size below 7 microns. U.S. Pat. No. 4,323,657 discloses finely, redispersible dispersions of high melting polyhydroxyl compounds together with a process for their preparation. These polyhydroxyl compounds are stated to have a melting point higher than the maximum temperature reached when producing the polyurethane product made therefrom, hence these act as true fillers.

U.S. Pat. No. 4,302,551 relates to a process for preparing rigid cellular foam having urethane groups, isocyanaurate groups or both, with certain polymer dispersions.

U.S. Pat. No. 4,560,708 claims the use of crystalline, ethylenically unsaturated polyesters as dispersed phase in a polyhydroxyl compound. These crystallite suspensions are preferably used to prepare polyurethane-group-containing polyisocyanurate polymers.

U.S. Pat. No. 4,435,537 is about storage stable dispersions comprising certain aromatic polyesters dispersed in certain polyhydroxyl compounds. Key to this technology is the melting viscosity at 150 deg C. of the polyester which has to be between 15 and 3000 mPas.

Thus a new method of improving load-bearing of flexible polyurethane foam while maintaining other important properties such as tensile strength, tear strength, elongation, density, dry and humid compression sets, resiliency and air flow within acceptable limits is desirable. Moreover, it would be desirable that technology for improving load-bearing can be implemented using commonly available foaming equipment and under other processing conditions similar to those currently used in making flexible polyurethane foams.

It has been surprisingly found that polyurethane foams having specific fusible polymers therein have increased load bearing (hardness) and are more resistant to humid aging than foams produced in the absence of such fusible polymers. These improved properties are obtained without adversely affecting the other properties of the foam.

In one aspect the invention is a process for the production of a polyurethane flexible product by reaction of a mixture of
(a) at least one organic polyisocyanate with
(b) at least one isocyanate-reactive composition comprising
   (b1) from 50 to 99 percent by weight of at least one isocyanate-reactive material having a functionality from 2 to 8 and a hydroxyl number of 20 to 140
   (b2) from 1 to 50 percent by weight of an isocyanate reactive fusible polymer substantially free of aromatic and having (1) a melting point of between 45° C. and 180° C.; (2) a $T_g/T_m$ of less than 0.65, as measured in ° K; and (3) a calculated composite interaction parameter (chi) of fusible polymer with other polyurethane components of less than 2 at an absolute temperature of 400° K or a chi of greater than 1.6 at 300° K,
wherein the weight percent is based on the total amount of (b) and (b2)is either melted during the polyurethane production process through internal exotherm of the polyurethane reactions or is melted by external heating before or during the polyurethane reactions and reacts with the polyisocyanate; or is added dissolved in an appropriate solvent;
(c) optionally in the presence of a blowing agent and
(d) optionally additives or auxiliary agents known per se for the production of polyurethane foams.

In another aspect, this invention is a polyurethane product made as a result of the above process which possess either a crystalline microstructure as evidenced by either TEM (Transmission Electron Microscopy), DMS (Dynamic Mechanical Spectroscopy) or DSC (Differential Scanning Calorimetry).

In yet another aspect, this invention is a dispersion of micro-particles of less than 100 microns of a fusible polymer (b2) dispersed in the isocyanate-reactive material (b1).

In yet another aspect, this invention is a dispersion of micro-particles of less than 100 microns of a fusible polymer (b2) dispersed in the polyisocyanate (a).

In a further aspect, this invention is an isocyanate terminated prepolymer obtained by the reaction product of an excess of a polyisocyanate with a fusible polymer (b2) or a hydroxyl terminated prepolymer obtained by reaction of the fusible polymer with polyol (b1) and isocyanate.

In still another aspect, this invention is a foam made from the process disclosed herein.

Foams produced in accordance with the invention exhibit a number of important advantages. In accordance with the present invention, it is readily feasible to increase the hardness of polyurethane foams without having to forgo other valuable foam characteristics, such as, the elasticity and resilience as well as the open cell nature of the foam.

Further, relatively hard foams with relatively low unit weights can be manufactured, or the hardness of any given foaming system can be significantly increased without changing the unit weight or density.

In accordance with the present invention, a process for the production of polyurethane products is provided, particularly for polyurethane foams, using a fusible polymer. The use of a fusible polymer gives an increase in foam hardness as determined by the CFD. This increased hardness can be achieved with a decrease in the density of the foam below 100 Kg/m$^3$. In particular they have a foam density of less than 50 Kg/m$^3$. More preferred are foams that have a density of less than 40 Kg/m$^3$.

The increase in hardness will generally be 5 percent greater than a foam produced in the absence of the fusible polymer. Preferably, the foam has a hardness that is 10 percent greater than a foam produced in the absence of a fusible polymer.

The foams produced with the fusible polymers of the present invention also have improved 75% humid aged compression sets (HACS) as measured by ASTM D-3574-95.

The fusible polymer has a crystalline structure at room temperature and is preferably hydrophobic in its chemical composition. For instance it has relatively long aliphatic chains.

The isocyanate which may be used with the present invention include aliphatic, cycloaliphatic, arylaliphatic aromatic isocyanates and mixtures thereof. Aromatic isocyanates, especially aromatic polyisocyanates are preferred.

Examples of suitable aromatic isocyanates include the 4,4'-, 2,4' and 2,2'-isomers of diphenylmethane diisocyanate (MDI), blends thereof and polymeric and monomeric MDI blends toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyanates. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used. MDI or TDI based prepolymers can also be used, made either with polyol (b1) or (b2), or any other polyol as described heretofore. Isocyanate-terminated prepolymers are prepared by reacting an excess of polyisocyanate with polyols, including aminated polyols or imines/enamines thereof, or polyamines.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, saturated analogues of the above mentioned aromatic isocyanates and mixtures thereof.

For the production of flexible foams, the preferred polyisocyanates are the toluene-2,4- and 2,6-diisocyanates or MDI or combinations of TDI/MDI or prepolymers made therefrom.

For flexible foam, the organic polyisocyanates and the isocyanate reactive compounds are reacted in such amounts that the isocyanate index, defined as the number or equivalents of NCO groups divided by the total number of isocyanate reactive hydrogen atom equivalents multiplied by 100, ranges from 50 to 120 and preferably between 75 and 110.

The isocyanate-reactive materials (b1) for use in the present invention have an average of at least two isocyanate-reactive groups per molecule. Isocyanate-reactive compounds are well known in the art and include those described herein and any other commercially available polyol and/or SAN, PIPA or PHD copolymer polyols with solids levels up to 50%. (PIPA is the reaction of olamine with polyisocyanate to produce polyaddition products, see U.S. Pat. No. 4,374, 209. PHD stands for polyharnstoffdispersion.) Such polyols are described in Polyurethane Handbook, by G. Oertel, 2$^{nd}$ edition, Hanser publishers. Mixtures of one or more polyols and/or one or more copolymer polyols may also be used to produce polyurethane foams according to the present invention.

Representative polyols (b1) include polyether polyols, polyester polyols, polyhydroxy-terminated acetal resins, hydroxyl-terminated amines and polyamines. The term "polyol" shall be used herein to refer generally to these isocyanate-reactive compounds. Examples of these and other suitable isocyanate-reactive materials are described more fully in U.S. Pat. No. 4,394,491, the disclosure of which is incorporated herein by reference. Alternative polyols that may be used include polyalkylene carbonate-based polyols and polyphosphate-based polyols. Preferred are polyols prepared by adding an alkylene oxide, such as ethylene oxide, propylene oxide, butylene oxide or a combination thereof, to an initiator having from 2 to 8, preferably 2 to 6 active hydrogen atoms. Catalysis for this polymerization can be either anionic or cationic, with catalysts such as KOH, CsOH, Ba(OH)$_2$, boron trifluoride, or a double cyanide complex (DMC) catalyst such as zinc hexacyanocobaltate. Unsaturation can be as low as 0.01 meq/g.

The polyol or blends thereof employed depends upon the end use of the polyurethane product to be produced. The hydroxyl number and molecular weight of the polyol or polyols employed can vary accordingly over a wide range. In general, the hydroxyl number of the polyols employed may range from about 20 to about 150.

In the production of flexible polyurethane foam, the polyol (b1) is preferably a polyether polyol and/or a polyester polyol. The polyol generally has an average functionality ranging from 2 to 5, preferably 2 to 4, and an average hydroxyl number ranging from 20 to 100 mg KOH/g, preferably from 20 to 70 mg KOH/g. As a further refinement, the specific foam application will likewise influence the choice of base polyol. As an example, for molded foam, the hydroxyl number of the base polyol may be on the order of about 20 to about 60 with ethylene oxide (EO) capping, and for slabstock foams the hydroxyl number may be on the order of about 25 to about 75 and is either all propylene oxide (PO), or mixed feed EO/PO or is only slightly capped with EO. Both technologies use as (b1) blends of conventional polyols and/or copolymer polyols as described heretofore.

The initiators for the production of polyols (b1) generally have 2 to 8 functional groups that will react with the polyol. Examples of suitable initiator molecules are water, organic dicarboxylic acids, such as succinic acid, adipic acid, phthalic acid and terephthalic acid and polyhydric, in particular dihydric to octahydric alcohols or dialkylene glycols, for example ethanediol, 1,2- and 1,3-propanefdiol, diethylene glycol, dipropylene glycol, 1,4-butanediol, 1,6-hexanediol, glycerol, trimethylolpropane, pentaerythritol, sorbitol and sucrose or blends thereof. Other initiators include compounds linear and cyclic compounds containing a tertiary amine such as ethanoldiamine, N-methyldiethanolamine, triethanoldiamine, ethylene amines and various isomers of toluene diamine.

Polyol (b1) can contain BHT or any other proper antioxidants and have unsaturation (monol level) which can be as low as 0.01 meq/g.

The fusible polymers (b2) used in the present invention are solid, crystalline and preferably hydrophobic polyester polyols that undergo a phase transition between 45 and 180° C. Phase transition means a change in a property such as melting point (Tm). Preferably the fusible polymers undergo a phase transition between 45 and 140° C. More preferred are fusible polymers which undergo a phase transition between 50 and 120° C. The Tm can be measured by standard techniques in the art, such as differential scanning calorimetry.

Generally the fusible polymers are polyester polyols with an average hydroxyl equivalent weight from 250 to 10,000. Preferably the equivalent weight is between 500 and 8,000. Functionality of fusible polymer (b2) is from 2 to 8, more preferably from 2 to 4 and most preferably 2, to get optimal crystallization.

Processes for producing fusible polymers of the present invention are described in "Polyurethane Handbook" by G. Oertel, Hanser Publisher and include polycondensation of multifunctional carboxylic acids and hydroxyl compounds, polycondensation of hydroxy-carboxylic acids, the polymerization of ring esters (lactones) and the polyaddition of polycarboxylic anhydride with epoxides as well as in the reaction of acid chlorides with the alkali salts of hydroxyl compounds. Transesterification is also possible with hydroxyl as well as with carboxyl compounds.

Preferred fusible polymers for use in the present invention are derived from a ring opening polymerization process between a lactone and an initiator capable of initiating the ring opening. Other preferred fusible polyols can also be derived from the condensation polymerization of omega hydroxy acids or esters using a similar initiator as that described for lactone polymerization. Such lactones, esters and acids, which make up the repeating unit of the polyester, have 7 to 20 carbon atoms in the ring or in the chain. Preferred are lactones, esters and acids having 8 to 18 carbon atoms in the ring or in the chain. More preferred are lactones, esters and acids having 9 to 16 carbon atoms in the ring or in the chain. Most preferred are lactones, esters and acids having 11 to 16 carbon atoms in the ring or chain. The carbons of the lactone, esters and acids may be substituted with an alkyl, cycloalkyl, alkoxy and single ring aromatic hydrocarbon radicals. When the carbon atoms of the ring or chain contain such substituents, it is preferred that the total number of carbon atoms in the substituents on a lactone ring or chain does not exceed about 20.

Initiators that are suitable for producing such fusible polymers are compounds having 2 to 8 reactive sites, capable with or without the aid of a catalyst, of opening the lactone ring. Such reactive sites include hydroxyl, primary or secondary amine or thiol groups. Compounds having at least two hydroxyl groups per molecule are preferred. Preferred are initiators having 2 to 4 hydroxyl groups.

To increase the rate of the ring opening, various catalysts can be used. Such catalysts are known in the art and include basic and neutral, as well as acidic, ester interchange catalysts, including Group II transition metal base catalysts. Such catalysts are generally used in an amount form 0.001 percent to 0.5 percent by weight of the total reaction mixtures.

Reaction conditions to initiate and continue the polymerization of the lactone, esters and acids are known to those skilled in the art. For example, see U.S. Pat. Nos. 2,933,477 and 2,933,478, the disclosures of which are incorporated herein by reference.

Another example of fusible polymers (b2) are those produced from dicarboxylic acids, preferably aliphatic dicarboxylic acids, having 2 to 20 carbon atoms, preferably 6 to 15 carbon atoms, in the alkylene radical and multifunctional alcohols, preferably diols, having from 2 to 20 carbon atoms, preferably diols having 6 to 15 carbon atoms. Preferably the diacid is substantially free of any ethyleneically unsaturated groups (i.e., carbon-carbon double bonds). These acids include, for example, aliphatic dicarboxylic acids such as glutaric acid, succinic acid, adipic acid, pimelic acid, suberic acid, azelaic acid, sebacic acid, undecanediolic acid, dodecanedioic acid and cycloaliphatic dicarboxylic acids such as 1,3- and 1,4-cyclohexane dicarboyxlic acid. In general, aromatic dicarboxylic acids are not suitable as the melting point is too high, greater than 180° C. when an equivalent weight of 1000. Examples of di- and multifunctional alcohols are ethylene glycol, diethylene glycol, triethylene glycol, propylene glycol, dipropylene glycol, 1,3-propanediol, 1,2-butanediol, 1,4-butanediol and 1,6-hexanediol, 1,9-nonanediol, 1,10-decanediol, 1,12-dodecanediol, glycerine, neopentyl glycol, trimethylpropane.

Preferably, these polyesters, prepared by polycondensation of multifunctional carboxylic acids and hydroxyl compounds, are made from a diacid and a diol such that the repeating unit of acid+alcohol has in total at least 9 carbons atoms. More preferably these have a total of 10 to 30 carbon atoms.

The process for making such polyester polyols are well known to those in the art. See Polyurethane Handbook, by G. Oertel, $2^{nd}$ edition, Hanser publishers. An example of such polyester polyols available commercially is a polyol, having a molecular weight of about 3500 and a melting point of 65° C. sold by Degussa-Huls AG under the trademark DYNACOL 7381 and other related products as described in the technical leaflet: Dynacoll 7000, The Building Block System for Moisture Curable Hot Melt Adhesives and Sealants. Preferred products are the Dynacoll 7300 series which are partially crystalline solids. Similar compounds from other suppliers can also be used with this invention.

Fusible polymers (b2) also include polyester polyols produced by the polyaddition of a polycarbonate anhydride with epoxides. Such a process produced copolymers with alternating units obtained from the carboxylic anhydride and the epoxide. In general, the epoxide has 2 to 4 carbon atoms and the polycarbonate anhydride from 7 to 20 carbon atoms. Process for producing the starting monomers is given in *J. Am. Chem. Soc.* 85, 654 (1936).

Fusible polymers (b2) may also be produced by transesterification of a polyester with an alcohol having at least 2 hydroxyl groups. Preferred are alcohols having 2 to 4 hydroxyl groups. The process for producing such polymers are known in the art, see Polyurethane Handbook, by G. Oertel, $2^{nd}$ edition, Hanser publishers.

Fusible polymer (b2) can be combined with stabilizers, especially products which prevent or slow down hydrolysis. An example of such products are Stabapol* additives, available from Rhein Chemie Rheinau GMBH.

The components to produce the fusible polymers (b2) of the present invention are selected to produce compounds having the hydroxyl equivalent weight and hydroxyl numbers to give a melting point or Tm within the desired range stated above. The effect and activity of the fusible polymers is that the foaming system, in the course of the foaming and while there are still unreacted isocyanates left in the reactants, reaches a temperature that is above the melting temperature or Tm of the fusible polymer. In instances where the temperature of the foamed reaction mixture does not reach the melting temperature or Tm of the added fusible polymer, extraneous heat may be added to the system, or the fusible polymer can be blended in melted form with the other reactants.

The amount of fusible polymer (b2) used is generally from 1 to 50 weight percent of the total polyol composition (b). Preferably the amount of fusible polymer is present from 2 to 40 weight percent of (b). More preferably the amount of fusible polymer is present from 2 to 30 weight percent of (b). Most preferred is that from 2 to 20 weight percent of (b) is a fusible polymer (b2).

While not wishing to be bound by any theory of mode of action, it is believed that four main criteria are defining the fusible polymers that give the desired increase in foam load-bearing or elastomer E-modulus. First, the fusible polymer must have a crystalline melting temperature Tm which is (a) low enough to allow it to melt within the temperature window of fabrication, and (b) is high enough that once it recrystallizes and is incorporated into the foam or elastomer it does not melt but remain solid over the most common use temperature range of the fabricated article. This melting temperature range is from 45 to 180° C. Preferably the melting temperature range is 50 to 150° C.

Second, the fusible polymer must have a low ratio Tg/Tm, as expressed in absolute temperature units, to get the optimum "intrinsic crystallizability", a ratio of less than 0.75 is preferred, more preferably of less than 0.70, and most preferred is 0.65 or less.

Third, the fusible polymer must have a low "composite interaction parameter" (chi) with the mixture of the other formulation ingredients at elevated temperatures, hence above Tm, in order to have good "relative miscibility" when melted in order to disperse in these other components and be able to react with isocyanate. This (chi) composite should preferably be less than 2, more preferably less than 1.5 at temperature of 400° K.

Fourth, the fusible has a calculated chi value at 300° K is preferably higher than 1.6 to get phase separation upon cooling.

"Chi" values are unitless values which are conveniently calculated using Cerius$^2$, version 3 or higher software products of Molecular Simulations, Inc. Details on the calculation procedures are described in K. Choi and W. H. Jo, Macromolecules 30:1509–1514 (1997), the disclosure of which is incorporated herein by reference. Decreasing chi values predict improving relative miscibility. Good relative miscibility is predicted when the calculated chi value is 1.0 or below. Preferably, chi values for the high-melting polymer and organic polyisocyanate and/or the isocyanate-reactive component used in the highest concentration are developed. More preferably, chi values are developed for both the high-melting polymer and organic polyisocyanate and the isocyanate-reactive component used in the highest concentration. In addition, it is preferred to develop chi values over the temperature range that will be encountered during the processing of the formulation, that is, from about 300K to about 473K, more preferably from about 350K to about 453K. It should be noted that the molecular weight of the fusible polymer can be adjusted to meet these physical requirements.

The chi values given above are calculated to normalize to a 3,000 molecular weight of the high-melting or amorphous polymer. The same miscibility thresholds can also be used to identify other preferred embodiments of this invention at different molecular weights by using the value of (chi× MW)/3000 rather in place of the value chi itself as the basis of comparison if the molecular weights differs from 3,000. The values also use the assumption that the high-melting of amorphous polymer constitutes a volume fraction of about 0.1 of the total formulation and the polyurethane or polyurethane/urea hard segment weight fraction is about 0.3. It should be noted that the molecular weight of the fusible polymer can be adjusted to meet these physical requirements.

The fusible polymers of the present invention may be introduced into the foaming system in such a manner that the fusible polymers are dispersed in the polyol (b1) having active hydrogen atoms. The fusible polymers may also be directly added to the batch or system to be foamed in a fine distribution. In a preferred embodiment, the fusible polymer is introduced in the form of a dispersion in the polyol (b1).

It is important that the fusible polymer (b2) is dispersed as fine particles below 35 microns in polyol (b1), more preferably below 10 microns, and even more preferably below 3 microns when used to manufacture flexible foams. This allows a faster melting of (b2) during the foaming reactions and a better distribution of the isocyanate reacted fusible polymer in the final polyurethane matrix. It has been found that out of several ways to disperse the fusible polymer (b2) in (b1), the best procedure to get very fine particles of (b2) in (b1) is to pour or inject under strong stirring conditions melted (b2) in cold polyol (b1), cold meaning room temperature or temperature not higher than 40 deg C. Polyol (b1) Can be used by itself or can be preblended with the other components of the polyol formulation before adding the melted polymer (b2). Seed and/or stabilizer can be added to (b1) prior to pouring melted polymer (b2). In that case it could also be possible to heat (b1) and (b2) together until the melting point of (b2) is reached and then to cool everything under stirring. Another possible way to get fine particles is to inject in melted form the fusible polymer (b2) directly in the foaming machine mix-head and hence to disperse it instantaneously in the blend polyol (b1), water, catalysts, surfactants and other additives. Preferably this injection is done before the whole component system is put in contact with the isocyanate. Another option is the injection of melted polymer (b2) in the isocyanate stream of the machine mix-head, hence polymer (b2) can be reacted before being dispersed in the polyol blend. A fourth method consists in micronizing the particles of fusible polymer (b2) at room temperature and in adding proper anti-caking, wetting and/or stabilizer agents. Then this powder (b2) can be dispersed at room temperature under stirring in polyol (b1). Usually the temperature reached during this dispersion process, due to stirring, does not reach the melting point of polymer (b2). Finally another option is to dissolve the polymer in a proper solvent which will evaporate under the reaction exotherm and let the polymer precipitate and react in the polyurethane components. An example of such a solvent is methylene chloride.

All of these possibilities can be practiced with prepolymers made by pre-reacting polymer (b2) with an isocyanate or by reacting (b2) with the isocyanate in presence of (b1) under stirring. It is also feasible to transesterify (b2) in (b1) using proper catalysis, or even to produce (b2) in situ in the polyol (b1).

It is desirable that the reaction product between the fusible polymer (b2) and the isocyanate used to make the polyurethane foam is not too compatible with the rest of the foam components so as to separate and crystallize or re-solidify as a distinctive phase upon subsequent foam curing and cooling.

Polyurethane curing and cooling can be adjusted to optimize this crystallization or solidification. For instance, force cooling as described in U.S. Pat. No. 3,890,414 can be practiced with slabstock foams to speed up the cooling of the block and to get more uniform temperature upon curing. On another hand, with molded foams, which have much larger surface to volume ratio than slabstock foams, a post-curing at demold may improve the annealing of the crystallized or solidified polymer. In general, it is thought that rapid cooling is beneficial, provided the polymer (b2) has had time to react with isocyanate upon melting.

A seed may be added to the polyurethane reactants to organize and speed up the crystallization or solidification of the isocyanate reacted polymer (b2) in the polymer. For instance, the SAN particles of the copolymer polyol can be considered as acting as such a seed. Other seeds can be organic and/or inorganic compounds which are solid at room temperature. Catalysts as described in U.S. Pat. No. 5,489,618, in E.P. 1,018,525 and in E.P. 1,018,526 are of interest for the present technology.

Depending on the viscosity of the polyol to be foamed, dispersions may be formed whose viscosities might be too high for practical use. In such instances, it is feasible to use polyols or polyether monols with a lower viscosity as dispersion media. In doing so, it must be considered that the introduction of polyether monols into the foamed polyurethane foams causes a softening effect.

For producing a polyurethane-based foam, a blowing agent is generally required. In the production of flexible polyurethane foams, water is preferred as a blowing agent. The amount of water is preferably in the range of from 0.5 to 10 parts by weight, more preferably from 2 to 7 parts by weight based on 100 parts by weight of the polyol. Carboxylic acids or salts are also used as blowing agents. It is clear that the water level in the foam formulation by reacting with isocyanate influences the overall exotherm of the foaming mass and that the highest the water level in the foam formulation, the higher and the faster the exotherm is. Hence higher water containing formulation will melt more readily the fusible polymer (b2).

While not preferred for flexible foams, hydrocarbon blowing agents can be used to augment the blowing agent. Hydrocarbons are volatile $C_1$ to $C_5$ hydrocarbons. The use of hydrocarbons is known in the art as disclosed in EP 421 269 and EP 695 322, the disclosures of which are incorporated herein by reference. Preferred hydrocarbon blowing agents are butane and isomers thereof, pentane and isomers thereof (including cyclopentane), and combinations thereof. Also possible is the use of liquid or gaseous carbon dioxide as auxiliary blowing agent.

When a hydrocarbon, hydrochlorofluorocarbon, or the hydrofluorocarbon is used as a blowing agent, the amount is generally not more than 40 parts by weight of component (b) and preferably not more than 30 parts by weight of component (b). Water and a combination of hydrocarbon, hydrochlorofluorocarbon, or the hydrofluorocarbon may also be used a blowing agent.

In addition to the foregoing critical components, it is often desirable to employ certain other ingredients in preparing polyurethane polymers. Among these additional ingredients are surfactants, preservatives, flame retardants, colorants, antioxidants, reinforcing agents, stabilizers and fillers.

In making polyurethane foam, it is generally preferred to employ an amount of a surfactant to stabilize the foaming reaction mixture until it cures. Such surfactants advantageously comprise a liquid or solid organosilicone surfactant. Other surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 3 parts of the surfactant per 100 parts by weight total polyol (b) are sufficient for this purpose.

One or more catalysts for the reaction of the polyol (and water, if present) with the polyisocyanate can be used. Any suitable urethane catalyst may be used, including tertiary amine compounds, amines with isocyanate reactive groups and organometallic compounds. Exemplary tertiary amine compounds include triethylenediamine, N-methylmorpholine, N,N-dimethylcyclohexylamine, penta-methyldiethylenetriamine, tetramethylethylenediamine, bis (dimethylaminoethyl) ether, 1-methyl-4-dimethylaminoethyl-piperazine, 3-methoxy-N-dimethylpropyl-amine, N-ethylmorpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Salts of such amines can also be used as delayed action catalysts. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-laurate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. The amount of amine catalysts can vary from 0.02 to 5 percent in the formulation or organometallic catalysts from 0.001 to 1 percent in the formulation can be used. Autocatalytic polyols, based on amine initiators containing tertiary amine groups, can also be used to speed up the foaming or curing reactions.

A crosslinking agent or a chain extender may be added, if necessary. The crosslinking agent or the chain extender includes low-molecular polyhydric alcohols such as ethylene glycol, diethylene glycol, 1,4-butanediol, and glycerin; low-molecular amine polyol such as diethanolamine and triethanolamine; polyamines such as ethylene diamine, xylenediamine, and methylene-bis(o-chloroaniline). The use of such crosslinking agents or chain extenders is known in the art as disclosed in U.S. Pat. Nos. 4,863,979 and 4,963,399 and EP 549,120, the disclosure of which are incorporated herein by reference.

The applications for foams produced by the present invention are those known in the industry. Flexible foams find use in applications such as furniture, such as furniture cushions and mattresses or other bedding applications, and transportation vehicle seating, such as, automobile seats, two wheeled vehicles (motorized or not), watercraft, snowmobiles, all-terrain vehicles, aircraft and the like, sun visors, steering wheels, armrests, door panels, noise insulation parts and dashboards. The increase in hardness obtained pursuant to the present invention is of particular interest for foam systems which are marketed under the names of high resilient (HR) or cold foam, which is characterized by high resiliency measured according to ASTM D 3574-95 with values of at least 50 percent.

Processes for producing polyurethane products are well known in the art. In general components of the polyurethane-forming reaction mixture may be mixed together in any convenient manner, for example by using any of the mixing equipment described in the prior art for the purpose such as described in Polyurethane Handbook, by G. Oertel, Hanser publisher.

The polyurethane products are either produced continuously or discontinuously, by injection, pouring, spraying, casting, calendering, etc; these are made under free rise or molded conditions, with or without release agents, in-mold coating, or any inserts or skin put in the mold. In case of flexible foams, those can be mono- or dual-hardness.

When molding, the tool has to be maintained at the temperature giving best processing and fast curing. For instance, in case of flexible foams, the mold has to be kept at a temperature between 35 and 90° C., more preferably between 45 and 70° C. For Hot Cure molding, the mold is, after foam pouring, heated to temperatures between 150 and 200° C. Temperatures which are commonly attained in the core of slabstock foam buns are between 120 and 170° C.

The preparation of the polyurethane foams may be effected in closed molds or as free rise or as slabstock foam. When the foaming is carried out in molds, the reaction mixture to be foamed is inserted into a mold of metal or plastic. Generally, the amount of foamable reaction mixture to be inserted will be such that the mold is just filled. However, it is feasible to use larger amounts of foamable mixture. In producing slabstock foam in open vessels, the mixture to be foamed is inserted into a stationary open mold or onto a conveyor belt that is generally lined and the foam is allowed to rise. Proper square block processes can also be used to eliminate the top crown of the bun. The finish-foamed mold or slab foam bodies may subsequently be subjected to an after treatment as already discussed.

The following examples are given to illustrate the invention and should not be interpreted as limiting in anyway. Unless stated otherwise, all parts and percentages are given by weight.

A description of the raw materials used in the examples is as follows.

| | |
|---|---|
| SPECFLEX ™ NC 632 | is a glycerine/sorbitol initiated propylene oxide polymer capped with ethylene oxide available under the Tradename SPECFLEX from The Dow Chemical Company. The average hydroxyl number is 32, average equivalent weight is about 1726 and the functionality is between 4 and 5. |
| VORANOL CP 4702 | is a glycerine initiated propylene oxide polymer capped with ethylene oxide available under the trademark VORANOL from the Dow Chemical Company. The average hydroxyl number is 35. |
| VORANOL 3040 | is a glycerine propylene oxide polymer available under the trademark VORANOL from the Dow Chemical Company. The average hydroxyl number is 56. |
| VORANOL EP-2001 | is a 1,000 diol, capped with EO, available from the Dow Chemical Company. |
| VORANOL P-1010 | is a 1,000 diol, made from propylene oxide, available from The Dow Chemical Company. |
| VORANOL CP 6008 | is a 6,000 MW polyol initiated with glycerine and ethylene-oxide capped, available from The Dow Chemical Company. |
| VORANOL ™ CP 1421 | is a glycerine initiated polyol obtained by a mixed feed of ethylene oxide/propylene oxide using 75% ethylene oxide, available from The Dow Chemical Company under the Tradename VORANOL. The polyol has an average equivalent weight of about 1675 and an average hydroxyl number of 33. |
| VORANOL 4053 | is a sorbitol initiated polyol available from The Dow Chemical Company. |
| SPECFLEX ™ NC 700 | is a 40% SAN based copolymer polyol with an average hydroxyl number of 20 available from The Dow Chemical Company. |
| VORALUX HL 400 | is a 40% SAN based copolymer polyol, with an average hydroxyl number of 20 available from The Dow Chemical Company. |
| DEOA | is dliethanolamine. |
| 1,4-BDO | is 1,4-Butanediol. |
| NIAX ™ A-300 | is a proprietary delayed action amine catalyst available from CK-Witco-OSI Specialties. |
| NIAX ™ A-400 | is a proprietary delayed action amine catalyst available from CK-Witco-OSI Specialties. |
| NIAX A-1 | is an amine catalyst available from CK-Witco-OSI Specialties. |
| DABCO ™ 33 LV | is a triethylene diamine catalyst available as a 33 percent solution in dipropylene glycol available from Air Products and Chemicals Inc. |
| DABCO T-9 | is a Tin based catalyst available from Air Products and Chemicals Inc. |
| TEGO-STAB ™ B 8708 | is a silicone based surfactant obtained from Th. Goldschmidt Ag. |
| TEGOSTAB BF 2370 | is a silicone based surfactant obtained from Th. Goldschmidt AG. |
| TEGOSTAB B 8681 | is a silicone based surfactant obtained from Th. Goldschmidt AG. |
| DABCO ™ DC 5164 | is a silicone surfactant obtained from Air Products and Chemicals Inc. |
| FOMREZ UL-32 | is a Tin based catalyst available from Witco |
| VORA-NATE ™ T-80 | is an 80/20 blend of 2,4/2,6 isomers of Toluene diisocyanate available from The Dow Chemical Company under the Tradename VORANATE. |
| ISONATE M-125 | is 4,4'-Methyldiphenylisocyanate available from The Dow Chemical Company under the trademark ISONATE. |
| SPECFLEX NE-112 | is a MDI/PMDI blend available from The Dow Chemical Company. |
| PPDL2 | is a polypentadecalactone polyester based polymer prepared from pentadecalactone and a diol initiator, the preparation of which is described herein. PPDL2 has a Tm of about 92C., a Tg/Tm (° K.) of 0.573 and a calculated chi in a PPDL2/polyol/TDI blend of 3.72 at 300° K. and 1.62 at 400° K. |
| PPDL3 | is a polypentadecalactone polyester based polymer made with a triol initiator, the preparation of which is described herein. |
| PUDL2 | is a polyundecalactone (prepared via 11-hydroxyundecylenic acid methyl ester) polyester-based polymer made with a diol initiator, the preparation of which is described herein. |
| PUDL3 | is a polyundecalactone prepared via 11-hydroxyundecylenic acid methyl ester) polyester-based polymer made with a triol initiator, the preparation of which is described herein. |
| SEED A | is an 8% SAN based copolymer polyol made with Voranol CP 4702 polyol and with particle size below one micron. |
| STABILI-ZER A | is a 8% Lauryl methacrylate based polymer in Voranol CP 4702 polyol modified according to EP 162,589 |
| STABILI-ZER B | is a 8% Butyl acrylate based polymer in Voranol CP-4702 polyol modified according to EP 162,589 |
| DYNACOLL 7360 | is a polyester polyol with a melting point of 55° C. available from Degussa-Huels. Dynacoll 7360 has a Tg/Tm of 0.624 and a calculated chi composite of Dynacoll 7360/polyol/TDI blend of 2.08 at 300° K and 0.87 at 400° K. |
| DYNACOLL 7380 | is a polyester polyol with a melting point of 70° C. available from Degussa Huels. Dynacoll 7380 has a Tg/Tm of 0.62 and a calculated chi composite of Dynacoll 7380/polyol/TDI blend of 2.79 at 300° K. and 0.89 at 400° K. |
| DYNACOLL 7381 | is a polyester polyol with a melting point of 65° C. available from Degussa-Huels. Dynacoll |

-continued

| | |
|---|---|
| | 7381 has a Tg/Tm of 0.655 and a calculated chi composite of Dynacoll 7381/polyol/TDI blend of 1.88 at 300° K. and 0.89 at 400° K. |
| PCL | is a polycaprolactone polymer based on a diol initiator with 2,000 MW available from Aldrich. This product has a softening point of 50° C. PCL has a Tg/Tm of 0.655 and a calculated chi composite of PCL/polyol/TDI blend of 1.51 at 300° K. and 0.67 at 400° K. |

General experimental conditions were as follows.

Preparation of PPDL2. Pentadecalactone, PDL (100 g) and 1,6-hexane diol (6.0 g) in a 10:1 molar ratio are added to a vessel and heated to 150° C. under a nitrogen atmosphere with mixing. Tin(II)-2-ethyl hexanoate (0.5 g), a catalyst, is added and the temperature of the reaction is raised to 190° C. The progress of the polymerization is monitored by observing the disappearance of the PDL. When the polymerization is complete, the resulting hot polymer melt is poured into 700 mL of anhydrous toluene. The resulting solution is cooled to allow the polymer to precipitate. The resulting precipitate is isolated by filtration, washed with hexane and dried in a vacuum oven at room temperature to constant weight. The resulting polyester diol is isolated as a white crystalline solid having a Tg of –50° C. and Tm 89° C. A number average molecular weight of 2,770 was obtained as measured by MALDI-TOF mass spectroscopy.

Preparation of PPDL3. The preparation of PPDL3 is carried out in a similar manner as for PPDL2 except that 10.3 g of trimethylol propane (TMP) is used as the initiator and 150 grams of PDL is used. The polyol was recrystallized from 1 L of toluene to give 132 g of the polypentadecalactone triol. The measured Tm is 82.3° C.

General preparation for PUDL2 and PDDL2. The procedures for the preparation of both PUDL2 and PDDL 2 are the identical and we shall describe the preparation of PUDL2 in this example. This procedure is similar to that described for the preparation of PPDL2 except that methanol is removed during the coarse of the polymerization. The removal of methanol is further facilitated by the use of a vacuum towards the latter stages of the reaction. The desired vacuum is determined to such that only the methanol of condensation is removed along with residual traced of unreacted materials at the reaction temperature.

General preparation for PUDL 3 and PDDL3. The procedure is essentially the same as that described above for PPDL3, PUDL2 and PDDL2.

General Foam Formulation HR Molded and Free Rise Foams

In addition to the components listed in the working examples, the basic foam formulation used for HR foams contained the following components, in percent by weight of the polyol and/or polyol blend.

| Formulation A | | Formulation B |
|---|---|---|
| Voranol CP 4702 | 0 | 39 |
| Water | 3.7 | 3.7 |
| DEOA | 1.0 | 1.0 |
| NIAX A-300 | 0.25 (contains 50% water) | 0 |

-continued

| Formulation A | | Formulation B |
|---|---|---|
| NIAX A-400 | 0.1 (contains 30% water) | 0 |
| Niax A-1 | 0 | 0.08 |
| DABCO 33 LV | 0.3 | 0.50 |
| TEGOSTAB B 8708 | 0.80 | 0.80 |
| DABCO DC 5164 | 0.20 | 0.20 |

Bench and Machine Molded and Free Rise Foams

For examples 1–4 containing the PPDL-2 polymer, the PPDL was added to the NC 632 polyol, water, catalyst, silicone premix as a fine powder, then dispersed under stirring at 3,000 RPM for 30 s, before adding the isocyanate, stirring for another 5 s and pouring the reactants in a cardboard box in case of free rise foam, or in a 30×30×10 mm aluminum mold heated at 60 deg C. which was subsequently closed, in case of molding. For examples 5–7, the PPDL-2-NC 632 blend was heated to 100° C., hence above the melting point the PPDL-2 and the mixture was left cooling down to room temperature under high shear stirring at about 5,000 RPM. This process gave a fine dispersion of the PPDL in the NC632 polyol which has been measured to be around 35 microns. For examples 14–16 the PPDL and/or the Dynacoll's were melted at 100 deg C., then poured under stirring in the polyol, water, amine, surfactant premix maintained at room temperature, just prior to adding the isocyanate. This gave particle sizes which have been measured to be less than 10 microns. The release agent used for the molded foam was Klueber 41-2013 available from Klueber Chemie.

Machine Molded Foams

Machine molded foams were produced using a high-pressure impingement mix head. The mold temperatures was 60° C., polyol temperature 35° C. and the isocyanate temperature 20° C. The polyol recirculation pressure (bar) was 160 and the isocyanate recirculation pressure was 150 bar. The total output from the mix head into the mold is between 210–236 g/s depending on the formulation used. Mold size is 40×40×10 cm with a metal insert, hence with a total volume of 15.75 liters.

Slabstock Foams

Slabstock foams were produced using a Polymech machine equipped with high pressure mix-head and hydraulic stirrer. All raw materials were used at a temperature of 21 deg C. Polyol output was 20 kg/min at 3 bars pressure while other components were injected at pressures between 20 and 40 bars in the mix-head. Conveyor speed was 3.2 m/min and block width was 0.80 m.

General Foam Formulation Conventional Slabstock Foam

In addition to the components listed in the working examples, the basic formulation used for conventional (non HR) slabstock foams contained the following components in percent by weight of the polyol and/or polyol blend:

| | |
|---|---|
| Water | 4.0 |
| Niax A-1 | 0.04 |
| Dabco 33LV | 0.12 |
| Dabco T-9 | 0.18 |
| Tegostab BF 2370 | 0.80 |
| Voranate T-80 | (Index 110) |

Test Procedures

| | |
|---|---|
| Density | is measured according to ISO 845-95 and is expressed in kg/m3. |
| Airflow | is measured by test method ASTM D3574-95 and reported in cubic feet/min (cfm). |
| IFD | is indention force deflection as measured by ISO 2439-97 and is reported in Newton at 40% foam deflection. |
| CFD | is compression force deflection as measured by Peugeot D-41-1003-86 test method and is reported as kilo pascals under 25%; 50% and 65% deflections. |
| CS | is dry compression set as measured by Peugeot D-45.1046-83 test method (70% CD) and is reported as percent. |
| 75% Cs | is dry compression set as measured according to ISO 1856-80. |
| Elongation | is measured by Peugeot D-41.1050.85 test method and is reported in percent. |
| Tensile strength | is measured by Peugeot D-41.1050.85 test method and is reported in kilo pascals. |
| Tear strength | is measured by Peugeot D-41.1048-81 test method and is reported in Newton/meter. |
| Resiliency | is measured by ASTM 3574-95 test method and is reported in percent. |
| HACS | is a humid aging compression set test as measured by ASTM D3574-95 (75% CD) and is reported as percent. |
| Dynamic fatigue | is carried out according to Peugeot D-42.1047/B97 test method. Both height loss and load loss are reported in percent. |

EXAMPLES 1 TO 4

Bench scale tests were done to determine the effect of replacing part of a high functional polyol in a flexible foam formulation with PPDL2. The foam formulations and the properties of the resulting molded and free rise foam are given in Tables 1, 2 and 3 respectively.

TABLE 1

INITIAL BENCH SCALE STUDY ON MOLDED AND FREE RISE FOAM

| Foam Number | Ref A | 1 | 2 | 3 | 4 |
|---|---|---|---|---|---|
| NC 632 | 80 | 75 | 70 | 65 | 60 |
| NC 700 | 20 | 20 | 20 | 20 | 20 |
| PPDL2 powder | 0 | 5 | 10 | 15 | 20 |
| T-80 | 44.8 | 44.8 | 44.8 | 44.8 | 44.8 |
| Index | 100 | 100 | 100 | 100 | 99 |
| Demold time (min) | 4 | 4 | 4 | 5 | 5 |
| Mold fill time (s) | 43 | 44 | 44 | 47 | 49 |
| (Part weight) | 333 | 332 | 340 | 338 | 336 |
| Molded density | 37 | 37 | 37.8 | 37.6 | 37.3 |
| Temperature at mold fill (C.) | 70 | 68 | 69 | 67 | 73 |
| Time to reach 90 deg C. (s) | 80 | 87 | 87 | 87 | 88 |
| Demold Temperature (C.) | 133 | 130 | 129 | 123 | 122 |
| FREE RISE FOAM | | | | | |
| Cream Time (s) | 10–11 | 9 | 10 | 10 | 10 |
| Gel time (s) | 65 | 65 | 63 | 68 | 80 |
| Rise time (s) | 85 | 105 | 104 | 100 | 91 |

TABLE 1-continued

INITIAL BENCH SCALE STUDY ON MOLDED AND FREE RISE FOAM

| Foam Number | Ref A | 1 | 2 | 3 | 4 |
|---|---|---|---|---|---|

Mold fill time is the time when the foam starts extruding through the mold vent holes.
Temperature at mold fill is the temperature recorded in the core of the foam with a very thin thermocouple at the time when the mold is filled.

TABLE 2

PROPERTIES OF MOLDED FOAMS PRODUCED ACCORDING TO THE FORMULATIONS OF TABLE 1

| Foam Number | Ref A | 1 | 2 | 3 | 4 |
|---|---|---|---|---|---|
| 40% IFD | 244 | 247 | 303 | 330 | 380 |
| Core Density | 34.7 | 33.7 | 35.0 | 35.4 | 36.9 |
| 25% CFD | 3.5 | 3.4 | 4.3 | 4.9 | 5.4 |
| 50% CFD | 5.2 | 5.2 | 6.5 | 7.5 | 9.0 |
| 65% CFD | 8.4 | 8.7 | 11 | 12.5 | 15.9 |
| Airflow | 3.4 | 3.2 | 3.1 | 3.7 | 3.5 |

The results in Table 2 show that the addition of the PPDL2 polymer increases the hardness of the foam as measured by CFD and IFD. It was unexpected to observe this increase in hardness as diol (PPDL2) is replacing the high functional polyol (NC 632). The substitution of part of the high functional polyol with the PPDL2 also need not decrease the airflow through the foam.

TABLE 3

PROPERTIES OF FREE RISE FOAM PREPARED ACCORDING TO THE FORMULATIONS OF TABLE 1

| Foam Number | Ref A | 1 | 2 | 3 | 4 |
|---|---|---|---|---|---|
| Core Density | 28.3 | 28.7 | 29.3 | 29.4 | 31.8 |
| 50% CFD | 3.4 | 4.0 | 4.5 | 4.8 | 6.3 |
| Airflow | 4.4 | 4.3 | 4.3 | 4.5 | 4.4 |

As observed for the molded foam, an unexpected increase in the hardness of the foam was obtained upon substitution of PPDL2 for part of the high functional polyol.

EXAMPLES 5 TO 7

Machine molded foams were prepared at three different indexes using two different levels of a copolymer polyol (NC 700) as control. The addition of copolymer polyol to flexible foam formulation is known to increase the hardness of the foam. A portion of the high functional polyol was then replaced by PPDL2. The formulations are given in Table 4 and the properties of the resulting molded foams are given in Table 5. For the controls, the results show that as the isocyanate index is increased, the hardness of the foam, as measured by CFD increases and the 75% HACS gets higher (worse). The same pattern is observed when an increase in the amount of the copolymer polyol is added to the formulation showing that the HACS are getting worse.

The substitution of part of the high functional polyol with the PPDL2 polyol unexpectedly showed an increase in the foam hardness as measured by 50% CFD and 40% IFD vs the foam based on 20 parts Specflex NC-700 and an improved 75% HACS vs the formulation based on 40 parts Specflex NC-700 which has equivalent hardness. This improvement in the foam hardness and HACS is obtained without adversely affecting the other properties of the foam, including dynamic fatigue.

TABLE 4

REFERENCE FORMULATIONS FOR MOLDED AND FREE RISE FOAMS

| | Examples* | | | | | | | | |
|---|---|---|---|---|---|---|---|---|---|
| | B | C | D | E | F | G | 5 | 6 | 7 |
| NC632 | 80 | 80 | 80 | 60 | 60 | 60 | 72 | 72 | 72 |
| NC700 | 20 | 20 | 20 | 40 | 40 | 40 | 20 | 20 | 20 |
| PPDL-2 diol as dispersion | 0 | 0 | 0 | 0 | 0 | 0 | 8 | 8 | 8 |
| CP 1421 | 0 | 0 | 0 | 0 | 0 | 0 | 0 | 0 | 0 |
| T-80 | 40.3 | 44.8 | 47 | 40.3 | 44.8 | 47 | 40.3 | 44.8 | 47 |
| Index | 90 | 100 | 105 | 91 | 101 | 106 | 90 | 100 | 105 |
| Mold fill time (s) | 44 | 36 | 37 | 37 | 35 | 35 | 46 | 44 | 47 |
| Temperature at fill (C.) | 76 | 73 | 71 | 71 | 72 | 72 | 75 | 75 | 73 |
| Demold time (min) | 4 | 4 | 4 | 4 | 4 | 4 | 4 | 4 | 4 |
| Part weight | 584 | 587 | 589 | 587 | 590 | 587 | 595 | 584 | 588 |
| Molded density | 37.1 | 37.3 | 37.4 | 37.3 | 37.5 | 37.4 | 37.8 | 37.1 | 37.3 |
| Time at 90 deg C. (s) | 69 | 64 | 62 | 73 | 60 | 59 | 72 | 66 | 68 |
| Demold temp (C.) | 136 | 137 | 139 | 134 | 140 | 140 | 130 | 134 | 135 |
| Free Rise Foam | | | | | | | | | |
| Cream time | 5 | 5 | — | 4 | 4 | — | 3 | 3 | — |
| Gel time s | 61 | 60 | — | 55 | 57 | — | 56 | 58 | — |
| Rise time s | 120 | 131 | — | 103 | 107 | — | 91 | 104 | — |
| Free rise density | 27 | 26.5 | — | 26.5 | 26.5 | — | 28.5 | 27 | — |

*Examples B–G are controls and are not examples of the present invention.

TABLE 5

PHYSICAL PROPERTIES OF MACHINE MADE FOAMS USING THE FORMULATIONS GIVEN IN TABLE 4.

| | Example* | | | | | | | | |
|---|---|---|---|---|---|---|---|---|---|
| | B | C | D | E | F | G | 5 | 6 | 7 |
| PPDL diol (PHP) | 0 | 0 | 0 | 0 | 0 | 0 | 8 | 8 | 8 |
| Iso index | 90 | 100 | 105 | 91 | 101 | 106 | 91 | 101 | 106 |
| NC-632 | 80 | 80 | 80 | 60 | 60 | 60 | 72 | 72 | 72 |
| NC-700 | 20 | 20 | 20 | 40 | 40 | 40 | 20 | 20 | 20 |
| 40% IFD (N) | 199 | 243 | 262 | 242 | 286 | 302 | 223 | 267 | 300 |
| Core Density | 36.0 | 36.0 | 36.1 | 36.3 | 35.6 | 35.1 | 36.6 | 36.3 | 37.2 |
| 50% CFD | 4.1 | 4.8 | 5.2 | 4.9 | 5.6 | 6.0 | 4.4 | 5.7 | 6.1 |
| Airflow | 2.3 | 2.4 | 2.7 | 1.7 | 2.3 | 2.2 | 2.0 | 2.4 | 2.4 |
| Tensile str | 131 | 147 | 143 | 184 | 181 | 178 | 149 | 155 | 159 |
| Elongation | 116 | 116 | 100 | 120 | 110 | 99 | 122 | 103 | 99 |
| Tear str | 1.9 | 2.2 | 1.7 | 2.3 | 2.3 | 2.1 | 2.1 | 2.1 | 2.2 |
| 70% CS | 9.0 | 8.3 | 7.7 | 10.3 | 8.6 | 8.1 | 10.0 | 8.7 | 8.9 |
| 75% HACS | 17.2 | 27.1 | 25.2 | 25.8 | 38.0 | 41.5 | 17.9 | 23.2 | 23.7 |
| Peugeot fatigue test D42/1047 | | | | | | | | | |
| Height loss (%) | 2.7 | 2.5 | 2.4 | 3.1 | 2.6 | 1.6 | 2.7 | 2.8 | |
| Load loss (%) | 14.4 | 12.8 | 12.8 | 13.0 | 12.5 | 12.0 | 11.8 | 14.7 | |

TABLE 5-continued

PHYSICAL PROPERTIES OF MACHINE MADE FOAMS USING THE FORMULATIONS GIVEN IN TABLE 4.

| Example* | | | | | | | | |
|---|---|---|---|---|---|---|---|---|
| B | C | D | E | F | G | 5 | 6 | 7 |

*Examples B–G are controls and are not examples of the present invention.

EXAMPLES 8 TO 11

Machine molded foams were prepared as per examples 1–4 wherein the fusible polymer PDDL3 was substituted for PPDL 2. The foam formulations and the resulting properties of the foam are given in Table 6.

TABLE 6

FLEXIBLE FOAM FORMULATIONS USING PPDL3

| | Example | | | |
|---|---|---|---|---|
| | 8 | 9 | 10 | 11 |
| NC 632 | 75 | 70 | 65 | 60 |
| NC 700 | 20 | 20 | 20 | 20 |
| PPDL triol as dispersion | 5 | 10 | 15 | 20 |
| CP 1421 | 0 | 0 | 0 | 0 |
| T-80 | 44.8 | 44.8 | 44.8 | 44.8 |
| Part weight | 332 | 334 | 325 | 333 |
| 40% IFD N | 236 | 271 | 300 | 345 |
| Core density (kg/m$^3$) | 34.3 | 34.7 | 35.0 | 35.2 |
| 25% CFD | 3.2 | 3.8 | 4.1 | 4.8 |
| 50% CFD | 5.1 | 6.0 | 6.7 | 7.9 |
| 65% CFD | 8.5 | 10.1 | 11.6 | 13.6 |
| Airflow | 3.1 | 2.8 | 2.7 | 2.0 |
| Resiliency | 65.5 | 62.5 | 60.5 | 56.5 |
| Tensile strength | 130 | 136 | 144 | 151 |
| Elongation | 86 | 83 | 86 | 76 |
| Tear strength | 2.3 | 2.5 | 2.6 | 2.8 |

These results show that the PPDL3 improves the hardness of the foam without having a negative affect on the other foam properties.

EXAMPLES H TO K

Examples H to K are comparative examples. Foams were made on the bench using a dispersion of PCL (polycaprolactone diol 2,000 MW) in Specflex NC-632 prepared as with examples 5–7. Formulations and foam physical properties are reported in table 7 showing that PCL did not give any hardness increase.

TABLE 7

COMPARATIVE EXAMPLES OF FOAMS MADE WITH PCL

| | Example | | | |
|---|---|---|---|---|
| | H | I | J | K |
| NC-632 | 75 | 70 | 65 | 60 |
| NC-700 | 20 | 20 | 20 | 20 |
| PCL | 5 | 10 | 15 | 20 |
| CP-1421 | 0 | 0 | 0 | 0 |
| T-80 | 44.8 | 44.8 | 44.8 | 44.8 |
| Demold time (mm) | 5 | 5 | 5 | 5 |
| Part weight (g) | 312 | 305 | 317 | 293 |
| 40% IFD | 218 | 203 | 205 | 204 |
| Core density (kg/m3) | 34.1 | 33.1 | 32.9 | 33.7 |
| 25% CFD | 3.3 | 3.0 | 3.0 | 3.2 |
| 50% CFD | 5.3 | 5.0 | 5.0 | 5.8 |
| 65% CFD | 8.8 | 8.6 | 8.7 | 10.6 |
| Airflow | 3.4 | 3.3 | 2.5 | 3.3 |

Addition of PCL does not change foam hardness.

EXAMPLES 12 AND 13

Slabstock foams were made using either Dynacoll 7360 or Dynacoll 7381, dispersed in Voranol 3040 following the procedure of examples 5–7 and in the following formulations:

TABLE 8

SLABSTOCK CONVENTIONAL FOAMS

| | Example | | | |
|---|---|---|---|---|
| | L | 12 | M | 13 |
| Voranol 3040 | 100 | 82.9 | 100 | 80.2 |
| Dynacoll 7360 | | 15 | | |
| Dynacoll 7381 | | | | 15 |
| Seed A | | 1.3 | | 2.4 |
| Stabilizer A | | | | 2.4 |
| Stabilizer B | | 0.8 | | |
| Particle size (microns) | | 35 | | 10 |
| Bun height (cm) | 50 | 50 | 50 | 50 |
| Core temperature peak (deg C.) | 160 | 160 | 160 | 160 |
| Core density | 24.2 | 23.3 | 25.5 | 23.8 |
| 40% IFD | 182 | 199 | 161 | 172 |
| Airflow | 2.6 | 2.5 | 4.3 | 4.3 |
| Guide factor | 7.5 | 8.5 | 6.3 | 7.2 |

Example L and M are comparative examples are not part of the present invention.
Guide factor is the ratio foam IFD/foam density.
These data show the hardening effect of both Dynacoll's.

EXAMPLES 14 TO 16

Bench foams were made with a formulation containing no SAN copolymer polyols as indicated below. The fusible polymer (b2) was introduced, at 100 deg C., in melted form in the polyol premix kept at room temperature, just prior to adding the isocyanate.

TABLE 9

BENCH HR FOAMS WITH MELTED POLYMER

| | Example | | | |
|---|---|---|---|---|
| | N (comparative) | 14 | 15 | 16 |
| NC-632 | 100 | 90 | 90 | 90 |
| PPDL-2 | | 10 | | |
| Dynacoll 7380 | | | 10 | |
| Dynacoll 7381 | | | | 10 |
| Water | 3.7 | 3.7 | 3.7 | 3.7 |
| DEQA | 1.0 | 1.0 | 1.0 | 1.0 |
| Niax A-1 | 0.05 | 0.05 | 0.05 | 0.05 |
| Dabco 33 LV | 0.80 | 0.80 | 0.80 | 0.80 |
| Tegostab B 8708 | 0.8 | 0.8 | 0.8 | 0.8 |
| Dabco DC 5164 | 0.2 | 0.2 | 0.2 | 0.2 |
| T-80 | 44.8 | 44.8 | 44.8 | 44.8 |
| Part weight (g) | 318 | 320 | 317 | 326 |
| 40% IFD | 145 | 188 | 177 | 173 |
| Airflow | 5.1 | 4.5 | 4.3 | 4.2 |

These data confirm the hardening effect of Dynacoll 7380 and Dynacoll 7381 which is comparable to PPDL-2

EXAMPLE 17

Slabstock foams were made with Specflex NE-112 as isocyanate as indicated in Table 10 and using Dynacoll 7360 as load-bearing enhancer which had been dispersed in the polyol following the procedure used for examples 5 to 7:

TABLE 10

| | Examples | |
|---|---|---|
| | T | 17 |
| Voranol CP 6008 | 100 | |
| Speoflex NC-632 | | 85 |
| Dynacoll 7360 | | 15 |
| Water | 3.5 | 3.5 |
| Niax A-1 | 0.05 | 0.05 |
| Dabco 33 LV | 0.25 | 0.25 |
| Tegostab B-8681 | 0.30 | 0.30 |
| DEOA | 0.75 | 0.75 |
| Voranol 4053 | 4.0 | 4.0 |
| Dabco T-9 | 0.15 | 0.15 |
| Specflex NE-112 | 67.8 | 67.8 |
| Air addition in mix head | Yes | Yes |
| Blow off time (s) | 83 | 73 |
| Core density (kg/m3) | 34.8 | 37.7 |
| 40% IFD (N) | 118 | 183 |
| Guide Factor | 3.4 | 4.8 |

Foam T is a reference and is not part of the invention.
Example 17 shows that addition of Dynacoll 7360 to a MDI based formulation gives a substantial increase in foam hardness.

Example 18

Slabstock foams were made with CO2 as an auxiliary blowing agent, as explained in Table 11, using a Cardio equipment from Cannon:

TABLE 11

| | Example | | |
|---|---|---|---|
| | U | V | 18 |
| Voranol CP 6008 | 100 | 70 | |
| Specflex NC-632 | | | 85 |
| Voralux HL 400 | | 30 | |
| Dynacoll 7360 | | | 15 |
| Voranol CP 1421 | 4.0 | 2.0 | 2.0 |
| Water | 3.7 | 2.7 | 2.7 |
| Niax A-1 | 0.05 | 0.10 | 0.10 |
| Dabco 33 LV | 0.25 | 0.20 | 0.20 |
| Tegostab B 8681 | 0.30 | 0.30 | 0.30 |
| DEOA | 0.75 | 0.50 | 0.50 |
| Dabco T-9 | 0.15 | 0.15 | 0.15 |
| Air (liter/min) | 2.5 | 16 | 24 |
| CO2 (PHP) | 0 | 2.8 | 2.8 |
| Specflex NE-112 | 64 | 48.5 | 48.5 |
| Index | 100 | 100 | 100 |
| Core Density | 33.5 | 26.7 | 32.7 |
| 40% IFD | 95 | 68 | 88 |
| Guide Factor | 2.8 | 2.5 | 2.7 |
| Airflow | 4.9 | 6.3 | 4.8 |
| Resiliency | 57.5 | 53.5 | 53 |
| 75% CS | 3.8 | 4.0 | 3.7 |

Examples U and V are comparative examples and are not part of this invention.

Data in Table 11 demonstrate that the use of Dynacoll 7360 in a CO2 blown slabstock foam, based on MDI, gives a foam harder than when using a copolymer polyol, Voralux HL 400, and is comparable in terms of physical properties to a formulation containing a high water level, hence a large amount of MDI.

EXAMPLES 19 AND 20

Prepolymers of Dynacoll 7381 were prepared by reacting one mole of this polyester with 2.1 moles of Isonate M-125 and 2.2 moles of a short MW diol. In example 19 the diol was Voranol EP 2001, and in example 20, it was Voranol P-1010. The reaction is carried out above the melting point of Dynacoll 7381 or 85° C. for 3 hours under stirring and without catalysis. Then Voranol CP 4702 is added to this prepolymer and this blend is cooled down under stirring to disperse the reacted Dynacoll in fine particles, with size below 5 microns. Two 17.2% by weight dispersions of such prepolymers, calculated on the total Dynacoll 7381 and Isonate M-125 were foamed on the bench using formulation B and data obtained are reported in Table 12:

TABLE 12

| Example | W | 19 | 20 |
|---|---|---|---|
| Specflex NC-632 | 41 | 33 | 33 |
| Voranol CP-4702 | 39 | 26 | 26 |
| Specflex NC-700 | 20 | 20 | 20 |
| Voranol EP-2001 | 0 | 13 | |
| Voranol P-1010 | 0 | | 13 |
| Dynacoll 7381 + Isonate M-125 | 0 | 8 | 8 |
| Part weight (g) | 341 | 335 | 335 |
| 40% IFD (N) | 191 | 237 | 241 |
| Core density | 35.6 | 34.7 | 34.9 |
| 25% CFD | 2.5 | 3.2 | 3.1 |
| 50% CFD | 4.4 | 5.2 | 5.4 |
| 65% CFD | 8.0 | 9.0 | 9.4 |
| Airflow | 4.1 | 3.2 | 3.2 |
| Resiliency | 63.5 | 57 | 58.5 |

Example W is a comparative example and is not part of this invention.

Data in Table 12 confirm that a prepolymer of Dynacoll 7381 gives increase foam load bearing with good foam airflow.

EXAMPLE 21

Bench scale tests were done to determine the effect of replacing part of a high functional polyol in a flexible foam formulation with Dynacoll 7380. The foam formulations and the properties of the resulting are given in Table 13.

TABLE 13

INITIAL BENCH SCALE STUDY ON MOLDED FOAM

| Foam Number | Ref X* | Ref Y* | 21 |
|---|---|---|---|
| NC 632 | 80 | 72 | 72 |
| NC 700 | 20 | 20 | 20 |
| Dynacoll 7380 | 0 | 0 | 8 |
| Fomrez 66–56 | 0 | 8 | 0 |
| Index | 100 | 100 | 100 |
| Demold time (min) | 4 | 4 | 4 |
| (Part weight) | 331 | 328 | 335 |
| 40% IFD (N) | 236 | 235 | 279 |
| Core density (kg/m$^3$) | 34.7 | 34.0 | 36.4 |
| 50% CFD | 5.0 | 5.3 | 6.2 |
| Airflow (CFM) | 4.6 | 4.5 | 4.6 |
| 75% HACS | 16.8 | 19.7 | 19.9 |

*Ref's X&Y are not part of the present invention.

The results in Table 13 show that Fomrez 66-56, which has a chi factor at 300° K below 1.6, does not give any hardness increase, while Dynacoll 7380, which has a chi factor of 2.79 at 300° K, shows higher foam load-bearing.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process for the production of a polyurethane product by reaction of a mixture of
   (a) at least one organic polyisocyanate with
   (b1) from 50 to 99 percent by weight of at least one isocyanate-reactive material having a functionality from 2 to 8 and a hydroxyl number of 20 to 140
   (b2) from 1 to 50 percent by weight of an isocyanate reactive fusible polymer substantially free of aromatic and having (1) a melting point of between 45° C. and 180° C.; (2) a T$_g$/T$_m$ of less than 0.65, as measured in ° K; and (3) a calculated composite interaction parameter (chi) of fusible polymer with other polyurethane components of less than 2 at an absolute temperature of 400° K or a chi of greater than 1.6 at 300° K., wherein the weight percent is based on the total amount of (b) and (b2) is either melted during the polyurethane production process through internal exotherm of the polyurethane reactions or is melted by external heating before or during the polyurethane reactions, and reacts with isocyanate,
   (c) optionally in the presence of a blowing agent and
   (d) optionally auxiliary agents known per se for the production of polyurethane foams.

2. The process of claim 1 wherein the isocyanate-reactive composition is a polyether or polyester polyol or a combination thereof.

3. The process of claim 1 wherein the fusible polymer is obtained by reacting an initiator with a lactone, omega hydroxy acid or ester wherein the lactone, omega hydroxy acid or ester having 7 to 20 carbon atoms in the ring or the chain.

4. The process of claim 3 wherein the lactone, omega hydroxy acids or esters have 8 to 18 carbon atoms in the ring or the chain.

5. The process of claim 4 wherein the lactone, omega hydroxy acid or ester have 9 to 16 carbon atoms in the ring.

6. The process of claim 3 wherein the initiator is a polyalcohol having 2 to 8 hydroxyl groups.

7. The process of claim 6 wherein the initiator is a polyalcohol having 2 to 4 hydroxyl groups.

8. The process of claim 3 wherein the hydroxyl equivalent weight of the fusible polymer is from 800 to 10,000.

9. The process of claim 8 wherein the hydroxyl equivalent weight of fusible polymer is 800 to 5,000.

10. The process of claim 1 for making a flexible foam wherein (b1) and (b2) are polyols having an average functionality of 2 to 4 and an average hydroxyl number of 20 to 100.

11. The process of claim 10 wherein water is present in an amount from 0.5 to 10 parts by weight of (b).

12. The process of claim 11 wherein carbon dioxide is present as a gas or as a liquid to act as an auxiliary blowing agent.

13. The process of claim 1 wherein the polyisocyanate is toluene diisocyanate, polymethylene diisocyanate, isomers of diphenylmethane diisocyanate or mixtures thereof.

14. A flexible polyurethane product obtained from the process of claim 13.

15. The flexible polyurethane product of claim 14 wherein the product is in the form of a transportation vehicle seat.

16. The product of claim 15 wherein the seat is an automobile seat.

* * * * *